Oct. 8, 1935.　　　　　W. E. JOHN　　　　　2,016,803
MEANS FOR MODIFYING THE TRANSMITTED LIGHT IN
MOVING LENS CINEMATOGRAPH MACHINES
Filed Feb. 24, 1934
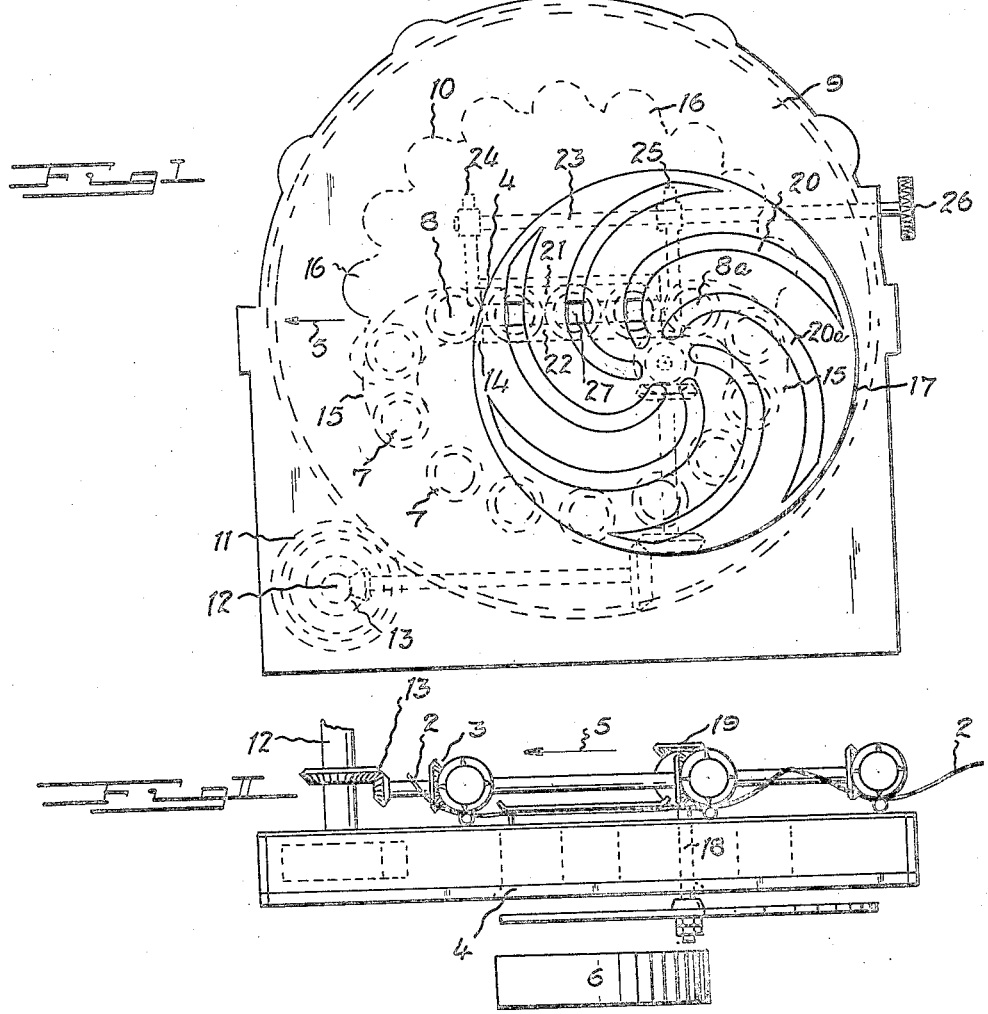
INVENTOR:
WESLEY ERNEST JOHN
BY: Francis E. Boyce
ATTORNEY Patented Oct. 8, 1935

2,016,803

UNITED STATES PATENT OFFICE 2,016,803

MEANS FOR MODIFYING THE TRANSMITTED LIGHT IN MOVING LENS CINEMATOGRAPH MACHINES

Wesley Ernest John, Johannesburg, Transvaal, Union of South Africa

Application February 24, 1934, Serial No. 712,699
In Great Britain August 25, 1933

1 Claim.  (Cl. 88—16.8)

The present invention relates to cinematograph cameras in which a single series of lenses moves continuously with the film and in which several lenses of the series are exposed simultaneously through an elongated aperture arranged with its length in the direction of movement of the lenses and the film.

The object of the present invention is to provide means for stopping down the light, which meets the peculiar conditions set up by a camera of this kind.

It is not possible to restrict the light by varying the length of the aperture since to do so would alter the number of lenses which are simultaneously exposed in the aperture. The number of lenses to be simultaneously exposed in the aperture is a matter to be determined by other considerations, such as the number of constituent pictures it is desired to have in the single composite picture produced by the optical means above referred to.

It is possible to contract the aperture in the direction of its width by adjustable shutters, but this alone does not give satisfactory results since it tends to distribute the light unevenly over the width of the film.

According to the invention there is provided a rotatable disc provided with spiral slots. Said slots are arranged to cross the aperture substantially at right angles. The disc is rotated with the mechanism which drives the series of lenses and the film and the slots are so shaped that as they are superimposed upon the aperture they are spaced equally with the lenses exposed in the aperture and traverse the length of the aperture at the same speed as the lenses, so that each remains opposite a lens. The width of a slot is such that it suppresses a portion of the light which would otherwise be transmitted by its lens. Shutters, preferably adjustable, are provided at the long sides of the aperture whereby the effective length of each disc slot is reduced to an approximate square concentric with each lens.

The invention is illustrated in the accompanying drawing in which:—

Figure I is a front elevation of a cinematograph provided with an apertured rotating wheel for modifying the light volume.

Figure II is a plan of Figure I.

Referring to Figures I and II, 2 indicates a picture film which is driven continuously by mechanism 3 and travels past an aperture 4 elongated in the direction of travel of the film as indicated by the arrow 5.

The optical system is of the kind referred to in United States specifications 1,768,772 and 1,822,528 and comprises a fixed composing lens 6 and a number of loose carriers 7 each containing a lens system 8. 9 is a casing containing a pocketed wheel 10, which latter is rotated in unison with the film feed mechanism 3 by means of a pinion 11 fast on a shaft 12 and gearing 13. Said casing also provides a straight guide 14 parallel with the film and terminating in curved end guides 15. The lens carriers 7 are arranged as an endless train occupying the straight guide 14, its curved terminals 15, and the wheel pockets 16 extending between said terminals. Rotation of the wheel 10 causes the lenses 8 to circulate so that those in the straight guide 14 move parallel to and at the same speed as the film 2; and some of them are constantly exposed at the slot 4.

When the parts are embodied in a camera the effect is that a number of separate images are projected onto a length of sensitive film which is exposed at the slot 4 and said images are stationary relatively to the film.

According to the invention there is interposed in the light path and preferably between the composing lens 6 and the moving lenses 8, a disc 17 mounted on a shaft 18 which is arranged parallel with the axis of the optical system. Said shaft is connected by gearing 19 to the shaft 12 so as to rotate synchronously with the wheel 10 and the film feed mechanism 3.

In said disc are provided a number of spiral slots 20, 20a etc. so arranged as to cross the aperture 4 substantially at right angles and such also that when the various parts described are in motion, any given slot such as 20a enters the field of projection simultaneously with one moving lens such as 8a and in front thereof and remains in that position relatively to the lens 8a until the latter passes beyond the aperture 4.

Said slots are made narrower than the diameter of the lenses 8 whereby the reduced light transmitting aperture thus defined by each disc aperture consists of a materially diametral strip of the lens circle. The aperture 4 is provided with longitudinal shutters 21, 22 which are adjustable simultaneously towards and from the horizontal central line of the aperture 4, by means of a pinion 23 engaging racks 24, 25 at its opposite ends, said racks being rigid with the shutters 21, 22 respectively. A milled handwheel 26 is provided for rotating the pinion: and, by adjusting it, the effective width of the aperture 4 can be made equal to the width of the slots 20, 55 so that the effective light transmitting area is represented by an approximate square 27.

I claim:

In a cinematograph camera, the combination of means to feed a film continuously, a single series of lenses moving with the film, means providing an aperture which is elongated in the direction of movement and at which several lenses of the series are exposed simultaneously, a disc interposed in the light path and connected to the film and lens driving mechanisms to rotate therewith, said disc providing spiral slots such that a portion of each remains opposite a moving lens during exposure of the latter, said slots being narrow whereby they reduce the amount of light which would otherwise be transmitted by the lenses, and means for limiting the width of the aperture.

WESLEY ERNEST JOHN.